United States Patent [19]

Sweeting

[11] 4,277,269
[45] Jul. 7, 1981

[54] PROCESS FOR THE MANUFACTURE OF CERAMIC OXIDE FIBERS FROM SOLVENT SOLUTION

[75] Inventor: Truett B. Sweeting, Youngstown, N.Y.

[73] Assignee: Kennecott Corporation, Stamford, Conn.

[21] Appl. No.: 105,319

[22] Filed: Dec. 19, 1979

[51] Int. Cl.³ ...................... C03B 37/02; C03B 37/04
[52] U.S. Cl. .............................................. 65/2; 65/6;
 65/8; 65/14; 65/15; 264/8; 423/607; 423/610;
 423/625; 423/626
[58] Field of Search ......................... 65/2, 6, 8, 14–16;
 264/8; 425/7, 8; 423/607, 610, 626, 625

[56] References Cited

U.S. PATENT DOCUMENTS

| Re. 24,708 | 9/1959 | Heymes et al. | 65/6 |
| 3,485,611 | 12/1969 | Blaze | 65/6 |
| 4,159,205 | 6/1979 | Miyashara et al. | 423/625 X |

Primary Examiner—Robert L. Lindsay, Jr.
Attorney, Agent, or Firm—William H. Holt; Raymond W. Green; Michael L. Dunn

[57] ABSTRACT

A process and apparatus for the manufacture of ceramic oxide fibers from solvent solution. The process comprises spinning a solution of a ceramic oxide precursor through openings having a diameter of from about 0.3 to about 1.5 millimeters, attenuating the resulting fibers with a stream of air to a diameter of less than 10 microns and heating the fibers in an oxygen atmosphere to form ceramic oxide fibers having a diameter of less than 5 microns. The apparatus comprises a hollow rotatable disc having about 0.3 to about 1.5 millimeter holes in its circumferential edge; means for rotatably mounting the disc; means for introducing a solution of a ceramic oxide precursor into the disc; means for rotating the disc to force solution through the openings in fiber form; means for attenuating the fibers with a stream of air; and means for calcining the fibers.

20 Claims, 2 Drawing Figures

PROCESS FOR THE MANUFACTURE OF CERAMIC OXIDE FIBERS FROM SOLVENT SOLUTION

BACKGROUND OF THE INVENTION (a) Field of the Invention

This invention relates to a process for producing ceramic oxide fibers from a solvent solution of an oxide precursor which is soluble in the solvent. More particularly, the invention relates to such a process wherein the resulting fibers have very small diameters.

(b) History of the Prior Art

It is known in the prior art that certain oxide precursors may be dissolved in liquid and then spun in the form of fiber and the resulting fiber heated in an oxygen containing atmosphere to form an oxide fiber. For example, certain solvent soluble salts of metals whose oxides are ceramics can be used. Examples of such inorganic salts are aluminum chloride, basic aluminum chloride and zirconium oxychloride. Examples of suitable organic salts are aluminum, chromium, zirconium or titanium salts of a lower alkyl organic acid such as aluminum acetate, aluminum chloroacetate, aluminum formate, chromium oxyacetate, zirconium acetate and titanium acetate. In addition, some salts can be utilized in blends or mixes. It is to be understood that essentially any compound, which can be dissolved in a solvent to form a solution which can be fiberized and which results in a ceramic oxide fiber upon heating to a sufficient temperature, can be used as a ceramic oxide precursor. For example, basic aluminum chloride, which is an especially desirable ceramic oxide precursor, may be dissolved in water and the resulting solution spun to form a basic aluminum chloride fiber which upon heating, converts to a polycrystalline aluminum oxide fiber. Colloidal silica may also be included in the solution.

Difficulties were encountered in prior art processes for the manufacture of such fibers from solutions and in particular, it was difficult to form fibers having very small diameters, i.e., less than 5 and preferably less than 4 microns.

It has been known that certain molten materials can be fiberized by placing heat softened or melted material into a rotatable hollow element having aperatures in an outer peripheral wall followed by rotating the element to force the molten material through the aperatures to form fibers. It has also been known that such fibers made from molten material, while still soft immediately after leaving the element, can be contacted with a stream of gaseous fluid to assist in forming fine fibers (see e.g., U.S. Pat. No. 3,177,058 to G. Slayter et al and U.S. Pat. No. 4,111,673 to Van Natta).

It was not, however, recognized that such an apparatus would have any utility in forming fibers having diameters below 5 microns when the fibers are formed from a solvent solution of a ceramic oxide precursor rather than from a molten material.

This lack of understanding with respect to the formation of fine fibers from ceramic oxide precursor solution is emphasized by U.S. Pat. No. 3,485,611 to Blaze, Jr., wherein fibers are made from a fiberizable mixture such as zirconium oxide precursor dissolved in water to form a mixture having a viscosity of 40 to 45 poise. The mixture is then introduced into a hollow rotatable member having holes or openings which are sufficiently small to produce fibers having a diameter of from 2 to 3 microns. Air is used in the process merely to collect resulting fibers without attenuating the fibers. The low viscosity solutions, i.e., 40 to 45 poise, of necessity have a low solids content which results in an inferior fiber due to the requirement that large quantities of liquid be removed prior to calcining the fiber to form the oxide. Furthermore, the exceedingly small holes necessary to form the small fiber diameters readily plug thus reducing process efficiency.

BRIEF DESCRIPTION OF THE INVENTION

In accordance with the present invention, it has now been discovered that high viscosity solutions of ceramic oxide precursors can be formed into fibers having diameters of less than 5 microns through openings substantially larger than the resulting fiber diameter, i.e., of from about 0.3 to about 1.5 millimeters. In particular, the invention is a process for manufacturing ceramic oxide fibers having an average diameter of less than 5 microns from a solvent solution of an oxide precursor which is soluble in the solvent. The solution has a viscosity from about 100 to 450 poise. The process comprises introducing the solution into a spinning device comprising a hollow rotatable disc having a circumferential edge provided with a series of openings which openings have a diameter from about 0.3 to about 1.5 millimeters. As the solution is introduced, the disc is rotated at a sufficient angular velocity to provide sufficient pressure of the solution against the interior of the circumferential edge to force solution through the openings in a fiber form. The fibers are then attenuated to a diameter of less than 10 microns with a continuous stream of air and the resulting fibers are then heated in an oxygen atmosphere to a sufficient temperature to form ceramic oxide fibers having a diameter of less than 5 microns. The process is a substantial improvement over the prior art since the much larger openings do not easily become plugged and since solutions having much larger viscosities and thus much larger solid content can be used.

The invention further comprises an apparatus which is a spinning device comprising a hollow rotatable disc having a circumferential edge provided with a series of openings having an diameter of from about 0.3 to about 1.5 millimeters; means for introducing a solution of a ceramic precursor into the hollow disc; means for rotating the hollow disc at a sufficient angular velocity to provide sufficient pressure of the solution against the interior of the circumferential edge of the disc to force solution through the openings in a fiber form and means for attenuating the resulting fibers to a diameter of less than 10 microns with at least one continuous stream of air.

DETAILED DESCRIPTION OF THE INVENTION

Figure 1:
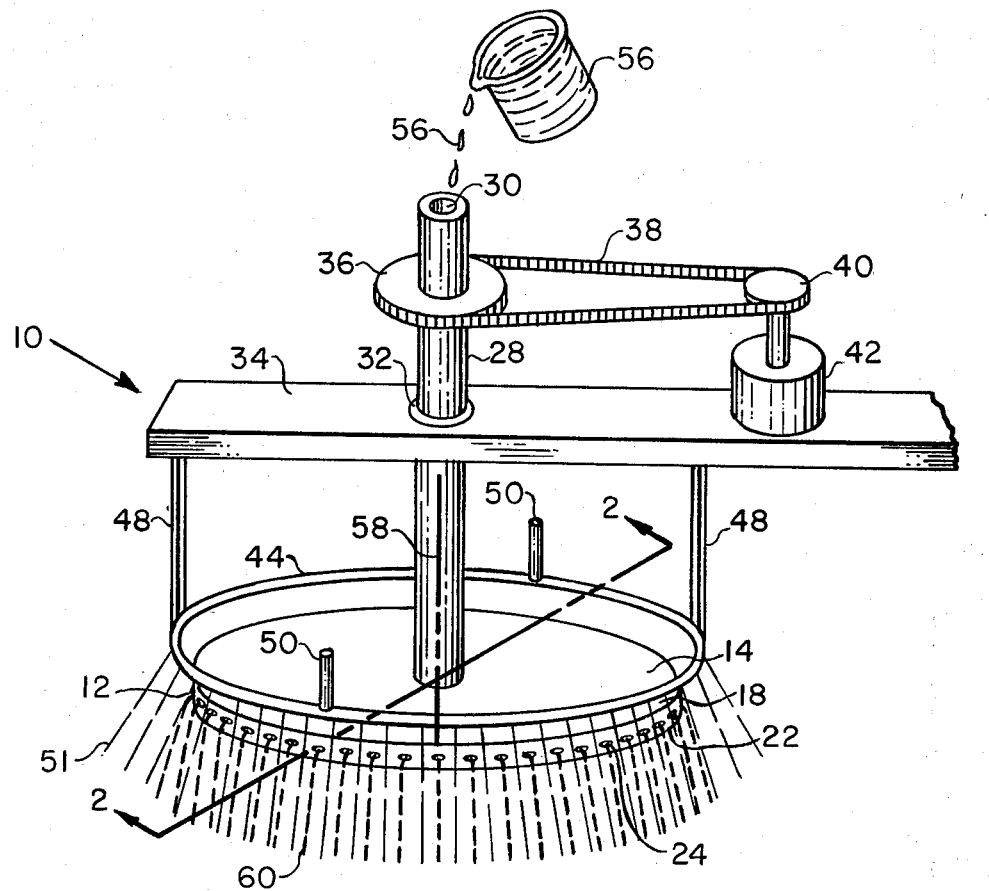
FIG. 1 is a side perspective view of the apparatus of the invention.
Figure 2:
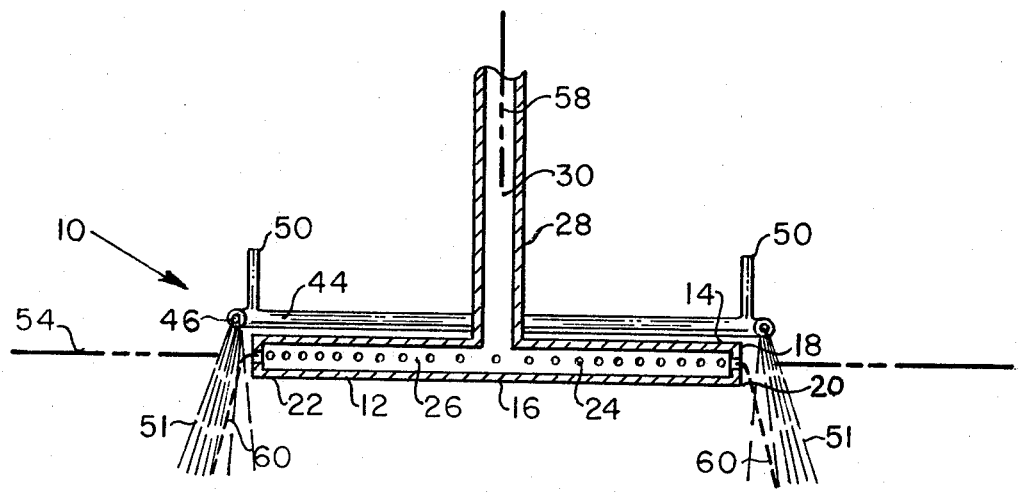
FIG. 2 is a cross sectional plan view of the apparatus of the invention taken along line 2—2 of FIG. 1.

The ceramic fibers manufactured in accordance with the process of the invention are usually aluminum, chromium, zirconium or titanium oxide fibers which usually have a polycrystalline or non-crystalline nature, i.e., are composed of microcrystals or are amorphous. For convenience, both types of fibers are referred to herein as polycrystalline fibers.

The average diameter of the ceramic fibers manufactured in accordance with the process of the invention is usually less than 5 microns and preferably less than 4 microns.

The oxide precursor utilized in the process of the invention is any compound which is soluble in the solvent selected for use with the process, which can be made to form a fiber by spinning its solution and which spun fiber will convert to a ceramic oxide fiber upon the application of sufficient heat in an oxygen containing atmosphere. Essentially, any aluminum, chromium, zirconium or titanium salt of a lower alkyl organic acid is a suitable oxide precursor. Examples of lower alkyl organic acids which can be used to form the salt are formic acid, acetic acid, propionic acid, butyric acid and lower alkyl hydroxy acids such as lactic acid. In general, when water is used as the solvent, the lower alkyl organic acid salt should be water soluble. Similarly, aluminum, chromium, zirconium or titanium salts of inorganic acids can be used as the oxide precursor. Again, when water is used as a solvent, the acid salt should be water soluble. An especially desirable inorganic acid for use in forming the salt is hydrochloric acid. Examples of suitable oxide precursors are aluminum chloride, basic aluminum chloride, aluminum acetate, aluminum chloroacetate, aluminum formate, chromium oxyacetate, zirconium oxychloride, zirconium acetate, titanium acetate and mixtures thereof.

The most preferred oxide precursor is basic aluminum chloride which has the approximate formula:

$Al_2(OH)_5Cl.2.4H_2O$.

By far, the most desirable solvent for use in accordance with the process of the invention is water due to its low cost, availability and low toxicity. Other polar solvents such as methanol, ethanol and acetone can, however, be used under certain circumstances, provided an appropriate oxide precursor is selected. Some non-polar compounds such as octane, benzene or toluene can also be used.

In general, the solution of the oxide precursor in the solvent has a viscosity from about 100 to 450 poise when it is used in accordance with the process of the invention. In order to obtain such a viscosity, the fiberizing solution usually contains from about 40 to about 60 weight percent of the oxide precursor. The solution is introduced into a spinning device which comprises a hollow rotatable disc having a circumferential edge provided with a series of openings which openings have a diameter of from about 0.3 to 1.5 millimeters. The solution is introduced into the device by any suitable means, however, in general such introduction into the hollow portion of the rotatable disc is accomplished at the center of the disc when the disc is in rotation.

The hollow rotatable disc is generally defined by top and bottom circular walls connected at their circumference by a circumferential edge. The distance between the top and bottom walls at the circumferential edge is usually between about 1 and about 5 centimeters. Openings pass through the circumferential edge to the hollow center of the rotatable disc which openings have a diameter of from about 0.3 to about 1.5 millimeters. The thickness of the circumferential edge is usually between 1 and 5 millimeters. The hollow rotatable disc may be manufactured by any suitable means including casting or welding. The top and bottom walls and circumferential edge may be one integral piece with no clear demarcation between them or they may have originally been separate pieces which are connected to each other by any suitable means such as welding. The openings preferably have a circular cross section but the cross section may be of another shaped such as a rectangle or hexagon if desired. Circular as used herein with respect to both the top and bottom walls and opening cross sections means approximately circular and may include almost circular elipses and essentially regular polygons having five or more sides.

The means for mounting said disc so that it is rotatable about an axis passing through the center of gravity of the disc and passing through the centers of the top and bottom walls may be any suitable means but usually consists of a support shaft connected to one of the walls and having its longitudinal axis passing through the center of gravity of the disc and retained in a support means such as a frame by suitable bearings such as sleeve, ball or roller bearings.

The means for introducing solution into the hollow rotatable disc again is any suitable means such as an opening into the hollow portion of the disc sealed by a mechanical seal and connected to a solution supply which is desirably metered. The preferred means for introducing solution is by metering with a metering means such as metering pump through a hollow support shaft which has a hollow portion passing through one of the walls.

The means for rotating the hollow disc at the sufficient angular velocity is any suitable rotating means such as a sprocket connected directly to the disc or to a rotatable support shaft driven by a chain and a drive means. Optionally, gears or belts can be used to accomplish the same purpose. In the preferred embodiment, the center of the disc is provided with a central shaft which permits the hollow disc to be rotatably mounted to suitable bearings. The shaft is also connected to a drive means for rotating the shaft and attached disc. The central shaft may be in one or more pieces and at least a portion of the shaft is desirably hollow to allow introduction of solution into the hollow portion of the disc.

The means for attenuating the fibers is a means for providing a stream or streams of air which strike the fibers while they remain sufficiently flexible to be moldable to extend the fibers and at the same time to reduce their diameter. The means for providing the stream of air includes a compressed air supply and nozzle means which directs the stream or streams of air in the proper direction and angle at the proper distance from the disc and in conjunction with the supply, at the proper velocity. Any suitable nozzle means may be used including orifices or slits in one or more pipes or rings or individually spaced nozzles about one or more pipes or rings.

In the process of the invention, the hollow disc is rotated at a sufficient angular velocity to provide sufficient pressure of the solution against the interior of the circumferential edge to force solution through the openings in a fiber form. Generally, for the viscosities of from about 100 to 450 poise, the sufficient pressure is usually from about 500 to about 2000 grams per square centimeter. Usually the disc is rotated in a horizontal plane for convenience in introducing solution into the disc and for convenience in collecting fibers without interference with other fibers being formed.

After the solution is forced through the openings of the circumferential edge, which openings have a diameter of from about 0.3 to about 1.5 millimeters and preferably from about 0.6 to about 1 millimeter and are of any desirable shape but are preferably circular, the resulting fibers are attenuated to a diameter of less than 10 microns with one or more continuous streams of air, at least one of which has a velocity of from about 5 to about 100 meters per second and an average velocity in excess of 25 meters per second. The stream of air is directed around the periphery of the disc at a direction within 45° of normal to the plane of rotation of the disc and desirably at about 30° from normal to the plane of rotation of the disc.

The stream of air desirably completely encompasses the disc and is generally from about 0.3 to about 7.5 centimeters from the circumferential edge of the disc. Furthermore, the air most desirably has a relative humidity of from about 40 to 70% to control the rate of evaporation of water from the forming fibers and in a preferred embodiment, has a temperature of from 18° to about 40° C.

After the fibers are attenuated, they are heated in an oxygen atmosphere to a sufficient temperature to form ceramic oxide fibers having a diameter of less than 5 microns. The heating temperature is preferably between about 700° and about 2000° C. and more preferably between about 850° and about 1500° C. when the ceramic oxide precursor is basic aluminum chloride. The heating time is usually in excess of about 15 minutes and sometimes in excess of about 1 hour.

In the preferred embodiment, when the spinning solution contains basic aluminum chloride, the basic aluminum chloride has a ratio of aluminum to chlorine of between 1.7:1 and 2.1:1. Desirably, the spinning solution contains from about 50 to about 60 weight percent basic aluminum chloride.

The ceramic oxide fiber produced in accordance with the process of the invention has excellent refractoriness and flexibility and is believed to comprise a fiber which is either noncrystalline or which contains small interconnecting or intertwined crystallites. Such fibers, produced in accordance with this invention, may be referred to herein as polycrystalline fibers.

It has been found that the presence of colloidal silica in the spinning solution improves retention of flexibility of resulting fibers at high temperatures. Usually from about 1 to about 30 weight percent silica in the final fiber is desirable.

Most desirably, to provide oxide precursor fibers having certain desirable characteristics, the solution may be heated to from about 30 to about 40° C. prior to forcing the solution through the openings. The prior heating permits rapid vaporization of the solvent thus more rapidly causing the oxide precursor to assume a fiber form.

Referring now to the drawings, in a preferred embodiment, apparatus 10 comprises a hollow disc 12 defined by top wall 14 and bottom wall 16 connected at their circumferences 18 and 20 by circumferential edge 22 which is provided with a series of openings 24 which pass through circumferential edge 22 into hollow portion 26 between bottom and top walls 16 and 14. Disc 12 is provided with a central shaft 28 which desirably has a hollow portion 30 which communicates to hollow portion 26 of the disc. A bearing 32 is provided for rotatably mounting shaft 28 within a frame member 34. A shaft sprocket 36 is provided which is connected to shaft 28 and which is also connected by means of chain 38 to motor sprocket 40 which is mounted to motor 42. A hollow ring 44 is provided which has a circumference of from about 6 to about 10 cm larger than the circumference of disc 12 and which is mounted by means of supports 48 to frame member 34 so that slot 46 in ring 44 is from about 3 to about 5 cm from circumferential edge 22 of disc 12. Hollow tubes 50 are provided which are connected to an air supply which is not shown so that air introduced through tubes 50 enters hollow ring 44 and flows from hollow ring 44 through slot 46 as a continuous stream of air 51 which is in a direction within 45 degrees of normal to the plane of rotation 54 of disc 12.

In operation, a solvent solution 56 is introduced by any suitable means including manual introduction into hollow portion 30 of shaft 28. Solvent solution 56 is a solvent solution of an oxide precursor which is soluble in the solvent which solution has a viscosity of from about 100 to 450 poise. After being introduced into hollow portion 30, solution 56 passes through hollow portion 30 in shaft 28 into hollow portion 26 in disc 12. Motor 42 rotates motor sprocket 40 which in turn by means of chain 38 turns shaft sprocket 36. Shaft sprocket 36 in turn rotates shaft 28 which causes disc 12 to rotate in plane 54 about axis 58. The rotation of disc 12 in turn forces solution 56 through openings 24 in the form of fibers 60. Air introduced into hollow tubes 50 enters ring 44 and flows in a continuous stream 51 from slot 46. The continuous stream of air 51 impinges fibers 60 thus attenuating them to a diameter of less than 10 microns.

Further, in accordance with the process of the invention, the fibers are then heated to a sufficient temperature in an oxygen containing atmosphere to convert the fibers of oxide precursor into fibers of a ceramic oxide which have a diameter of less than 5 and preferably less than 4 microns.

EXAMPLE

To illustrate the process and the use of the apparatus of the invention, an aqueous solution containing basic aluminum chloride, colloidal silica and lactic acid was concentrated to 63.5 weight percent solids and adjusted with water to a viscosity of 130 poise. The solution was fed into a hollow disc substantially in accordance with the apparatus as previously described. The disc had a diameter of about 15.24 cm and was rotated at about 2,750 rpm. The solution was thus extruded through holes having a diameter of about 0.38 mm. The spinning room humidity was about 55%. The filaments were then blasted with air directed through air nozzles seated into a $\frac{3}{4}$" circular pipe mounted essentially as previously described with respect to the apparatus of the invention. The pressure in the pipe was about 1.4 kg per sq. cm. Under these conditions, fibers with an average diameter of about 4.6 microns were produced after calcining. To illustrate that sufficient pressure must be maintained in the pipe to cause attenuating, dropping the pressure in the pipe to about 0.35 kg per sq. cm increases the average diameter of the finished fibers to about 7 microns. The aqueous solution utilized in this example contained about 55 weight percent basic aluminum chloride and about 10 weight percent of colloidal silica and about 8 weight percent of lactic acid with the balance being water.

What is claimed is:

1. A process for manufacturing ceramic oxide fibers having an average diameter of less than 5 microns from a solvent solution of an oxide precursor soluble in the solvent, said solution having a viscosity of from about 100 to 450 poises which process comprises:
   (a) introducing said solution into a spinning device comprising a hollow rotatable disc having a circumferential edge providing with a series of openings having a diameter of from about 0.3 to about 1.5 millimeters;
   (b) rotating said hollow disc at a sufficient angular velocity to provide sufficient pressure of said solution against the interior of said edge to force said solution through said openings in a fiber form;
   (c) attenuating said fibers to a diameter of less than 10 microns with a continuous stream of air; and
   (d) heating the fibers in an oxygen atmosphere to a sufficient temperature to form ceramic oxide fibers having a diameter of less than 5 microns.

2. The process of claim 1 wherein the oxide precursor is an aluminum, chromium, zirconium or titanium salt of a lower alkyl organic acid.

3. The process of claim 1 wherein the solvent is water and the oxide precursor is selected from the group consisting of aluminum chloride, basic aluminum chloride, aluminum acetate, aluminum chloroacetate, aluminum formate, chromium oxyacetate, zirconium oxychloride, zirconium acetate, titanium acetate and mixtures thereof.

4. The process of claim 1 wherein the solvent is water and the oxide precursor is basic aluminum chloride.

5. The process of claim 1 wherein the solution is heated to from about 30° to about 40° C. prior to forcing the solution through said openings.

6. The process of claim 1 wherein the continuous stream of air is at a temperature of from about 18° to about 40° C.

7. The process of claim 1 wherein the opening diameter is from about 0.6 to about 1 millimeter.

8. The process of claim 1 wherein the hollow disk is rotated at a sufficient speed to provide a sufficient pressure of about 500 to 2000 grams per square centimeter to force the solution through said openings.

9. The process of claim 1 wherein said continuous stream of air has a velocity of from about 5 to about 100 meters per second and the stream is directed around the periphery of said disc at a direction within 45 degrees of normal to the plane of rotation of the disc.

10. The process of claim 9 wherein the disc is rotated in a horizontal plane.

11. The process of claim 10 wherein the oxide precursor is basic aluminum chloride and the sufficient temperature is from about 850° to about 1500° C.

12. The process of claim 11 wherein the opening diameter is from about 0.6 to about 1 millimeter.

13. The process of claim 12 wherein said stream of air is from about 0.3 to about 7.5 centimeters from the circumferential edge of said disc.

14. The process of claim 13 wherein said stream of air has a relative humidity of from about 40 to about 70 percent.

15. An apparatus for manufacturing ceramic oxide fibers having an average diameter of less than 5 microns from a solvent solution of an oxide precursor soluble in the solvent, said solution having a viscosity of from about 100 to 450 poise, which apparatus comprises:
   (a) a hollow rotatable disc defined by top and bottom circular walls connected at their circumferences by a circumferential edge which edge is provided with a series of openings having a diameter of from about 0.3 to about 1.5 millimeters;
   (b) means for mounting said disc so that it is rotatable about an axis passing through the center of gravity of said disc and the centers of said top and bottom walls;
   (c) means for introducing said solution into the hollow portion of said hollow rotatable disc;
   (d) means for rotating said hollow disc about said axis at a sufficient angular velocity to provide sufficient pressure of said solution against the interior of said circumferential edge to force said solution through said openings in a fiber form;
   (e) means for attenuating said fibers to a diameter of less than 10 microns with at least one continuous stream of air; and
   (f) means for calcining the resulting fibers in an oxygen containing atmosphere to form ceramic oxide fibers having an average diameter of less than 5 microns.

16. The apparatus of claim 15 wherein means is provided for heating said continuous stream of air to from about 18° to about 40° C.

17. The apparatus of claim 15 wherein the opening diameter of said openings is from about 0.6 to about 1 millimeter.

18. The apparatus of claim 15 wherein the means for rotating said hollow disc rotates said disc at a sufficient speed to provide a sufficient pressure of about 500 to about 2000 grams per square centimeter to force the solution through said openings.

19. The apparatus of claim 15 wherein said means for attenuating said fibers provides a continuous stream of air having a velocity of from about 5 to about 100 meters per second and said means directs said stream of air about the periphery of said disc in a direction within 45° of normal to the plane of rotation of the disc.

20. The apparatus of claim 19 wherein said stream of air is from about 0.3 to about 7.5 centimeters from the circumferential edge of the disc.

* * * * *